United States Patent
Uphoff et al.

(10) Patent No.: US 8,033,105 B2
(45) Date of Patent: Oct. 11, 2011

(54) INTERNAL COMBUSTION ENGINE HAVING A SECONDARY AIR PUMP

(75) Inventors: Klaus Uphoff, Lehre (DE); Kai Bohnstedt, Braunschweig (DE); Mathias Dehmke, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 939 days.

(21) Appl. No.: 11/787,797

(22) Filed: Apr. 18, 2007

(65) Prior Publication Data
US 2007/0251219 A1    Nov. 1, 2007

(30) Foreign Application Priority Data
Apr. 19, 2006  (DE) .......................... 10 2006 018 200

(51) Int. Cl.
*F01N 3/00* (2006.01)
*F01N 3/10* (2006.01)
(52) U.S. Cl. ................. 60/305; 60/289; 60/299; 60/304
(58) Field of Classification Search .................. 60/289, 60/293, 295, 304, 305, 307, 299
See application file for complete search history.

(56) References Cited

U.S. PATENT DOCUMENTS
| | | | | |
|---|---|---|---|---|
| 4,056,933 A | * | 11/1977 | Nohira et al. | 60/278 |
| 4,215,542 A | * | 8/1980 | Kobayashi et al. | 60/290 |
| 6,041,593 A | * | 3/2000 | Karlsson et al. | 60/284 |
| 2005/0244285 A1 | * | 11/2005 | Koyama | 417/410.1 |

FOREIGN PATENT DOCUMENTS
| | | |
|---|---|---|
| DE | 26 17 245 A1 | 7/1977 |
| DE | 100 65 963 A1 | 7/2002 |
| EP | 0 983 424 B1 | 5/2003 |

OTHER PUBLICATIONS
Kind, English Abstract of DE 10 065 963 A1; Jul. 4, 2002.*

* cited by examiner

*Primary Examiner* — Thomas Denion
*Assistant Examiner* — Audrey Klasterka
(74) *Attorney, Agent, or Firm* — Manfred Beck, P.A.

(57) ABSTRACT

An internal combustion engine includes an exhaust-gas system with n>1 exhaust-gas flow configurations, wherein n is an integer. The exhaust-gas flow configurations are at least partly separated from one another and each of the exhaust-gas flow configurations includes at least one catalytic converter. The internal combustion engine includes a secondary air supply system with at least one secondary air pump and at least one secondary air valve. The at least one secondary air pump is connected, via the at least one secondary air valve, to at most n−1 of the exhaust-gas flow configurations upstream of the at least one catalytic converter of the at most n−1 of the exhaust-gas flow configurations. The remaining ones of the exhaust-gas flow configurations are separated from the secondary air supply system.

3 Claims, 2 Drawing Sheets

INTERNAL COMBUSTION ENGINE HAVING A SECONDARY AIR PUMP

CROSS-REFERENCE TO RELATED APPLICATION

This application claims the priority, under 35 U.S.C. §119, of German application DE 10 2006 018 200.6, filed Apr. 19, 2006; the prior application is herewith incorporated by reference in its entirety.

BACKGROUND OF THE INVENTION

Field of the Invention

The invention relates to an internal combustion engine having an exhaust-gas system which has at least two exhaust-gas flow configurations, which are at least partly separated from one another and which in each case have at least one catalytic converter, and the internal combustion engine having at least one secondary air pump which is connected upstream of the catalytic converters, via at least one secondary air valve, to the exhaust-gas system of the internal combustion engine.

For future diagnostic requirements for internal combustion engines it is necessary to check the functionality of secondary air systems individually for exhaust-gas groups during the operation of the engine. Usually several exhaust-gas groups, which are in each case characterized by a common catalytic converter, are jointly supplied with secondary air. An individual diagnosis of the exhaust-gas groups is only ensured by providing separate systems or by providing systems that can be separated by switchable valves.

German Patent Application Publication DE 100 65 963 A1 discloses a supply of secondary air to the exhaust-gas of individual cylinders of an internal combustion engine with at least two exhaust-gas lines which are partly separated from one another. A secondary air pump is connected to the separated exhaust-gas lines via separately controllable valves. In one operating state the controllable valve for an exhaust-gas line is closed and the controllable valve for another exhaust-gas line is open such that only the exhaust-gas of one cylinder group is supplied with secondary air.

SUMMARY OF THE INVENTION

It is accordingly an object of the invention to provide an internal combustion engine which is improved with respect to the secondary air-supply and with respect to a monitoring function (on-board diagnosis, OBD).

With the foregoing and other objects in view there is provided, in accordance with the invention, an internal combustion engine, including:

an exhaust-gas system including n>1 exhaust-gas flow configurations, n being an integer, the exhaust-gas flow configurations being at least partly separated from one another, the exhaust-gas flow configurations each including at least one catalytic converter;

a secondary air supply system including at least one secondary air pump and at least one secondary air valve; and the at least one secondary air pump being connected, via the at least one secondary air valve, to at most n−1 of the exhaust-gas flow configurations upstream of the at least one catalytic converter of the at most n−1 of the exhaust-gas flow configurations, and remaining ones of the exhaust-gas flow configurations being separated from the secondary air supply system.

In accordance with another feature of the invention, the internal combustion engine has working cylinders with respective outlets; each of the exhaust-gas flow configurations includes m>1 exhaust-gas pipes, m being an integer; the exhaust-gas pipes of the exhaust-gas flow configurations are connected to respective ones of the outlets of the working cylinders; the exhaust-gas pipes of each respective one of the exhaust-gas flow configurations merge with one another upstream of the at least one catalytic converter of each respective one of the exhaust-gas flow configurations and form a respective single exhaust-gas pipe; and each of the at most n−1 of the exhaust-gas flow configurations connected to the at least one secondary air pump is connected, with at least one of the m>1 exhaust-gas pipes, to the at least one secondary air pump.

In accordance with a further feature of the invention, each of the at most n−1 of the exhaust-gas flow configurations connected to the at least one secondary air pump is connected, with all of the m>1 exhaust-gas pipes, to the at least one secondary air pump.

In other words, according to the invention, there is provided, an internal combustion engine with an exhaust-gas system, which has at least n>1 exhaust-gas flow configurations which are at least partly separated from one another and which in each case have at least one catalytic converter, wherein n is an integer, and with at least one secondary air pump which is connected upstream of the catalytic converters, via at least one secondary air valve, to the exhaust-gas system of the internal combustion engine, wherein the at least one secondary air pump is connected, via the at least one secondary air valve, to at most n−1 or fewer exhaust-gas flow configurations and wherein the remaining exhaust-gas flow configurations are separated from a secondary air supply.

This has the advantage that in case of exhaust-gas systems with multiple exhaust-gas flow configuration the structural complexity and the monitoring expenditure for the on-board diagnosis (OBD) for the supply of secondary air is reduced. The secondary air pump(s) is/are selectively connected, via the secondary air valve(s), to at most n−1 or fewer exhaust-gas flow configurations. The remaining exhaust-gas flow configuration(s) is/are in no way and at no point in time of the operation of the internal combustion engine supplied with secondary air.

In accordance with a preferred embodiment, each of the exhaust-gas flow configurations includes m>1 exhaust-gas pipes, m being an integer, which are in each case connected to an outlet of a working cylinder of the internal combustion engine and which merge, upstream of the catalytic converter of this exhaust-gas flow configuration, with one another into a single exhaust-gas pipe, wherein, in case of each such exhaust-gas flow configuration which is connected to the secondary air pump, the secondary air pump is connected to at least one exhaust-gas pipe and in particular to all m exhaust-gas pipes.

Other features which are considered as characteristic for the invention are set forth in the appended claims.

Although the invention is illustrated and described herein as embodied in an internal combustion engine having a secondary air pump, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
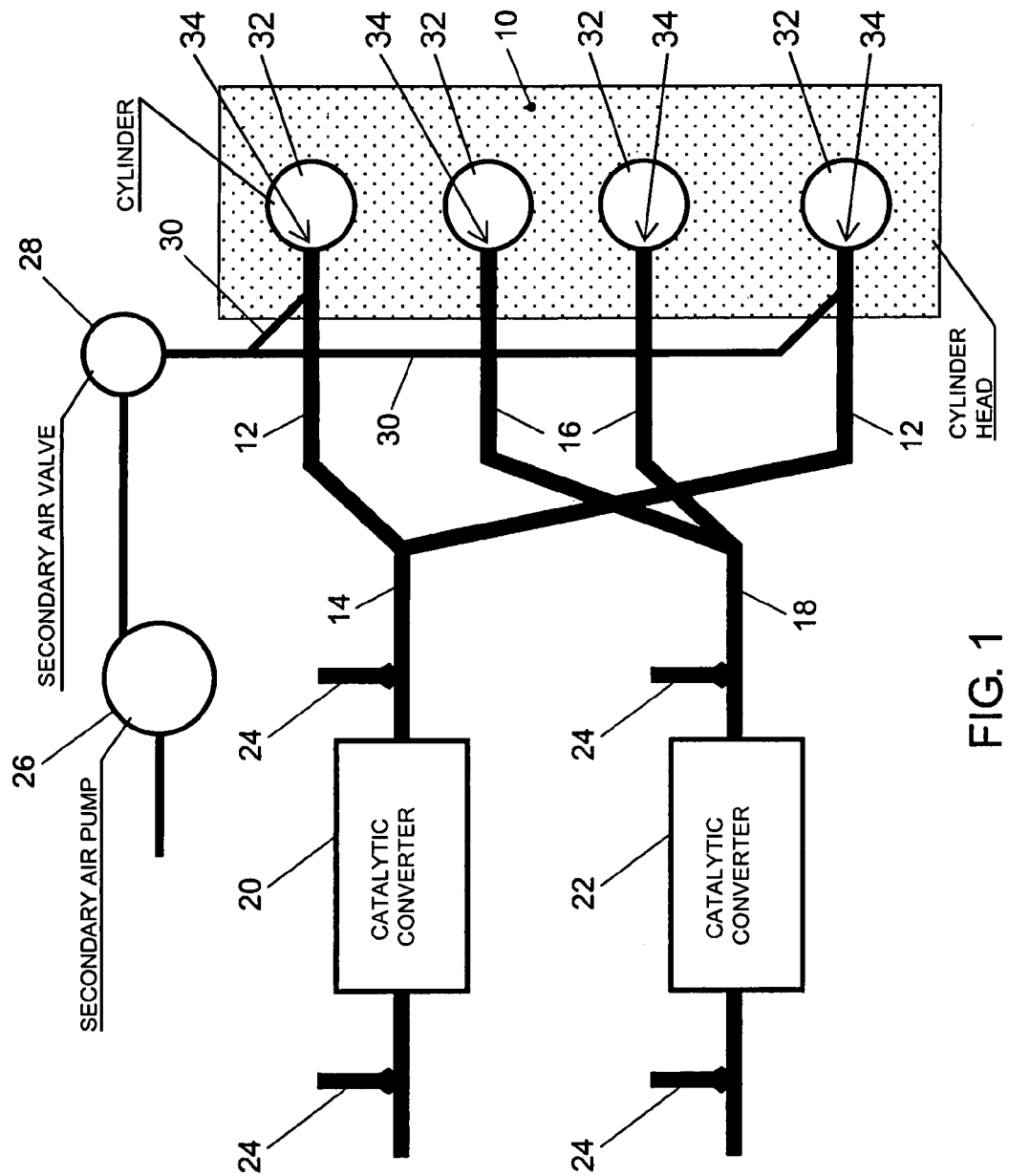
FIG. 1 is a schematic block diagram of a first preferred embodiment of an internal combustion engine in accordance with the invention.

Referring now to the figures of the drawings in detail, and first, particularly, to FIG. 1 thereof, there is shown a first preferred embodiment of an internal combustion engine according to the invention which includes a cylinder head 10 for four working cylinders 32, wherein first exhaust-gas pipes 12 respectively start at an exhaust-gas outlet 34 of a working cylinder 32 and merge into a first exhaust-gas flow configuration or exhaust-gas flow channel 14 and second exhaust-gas pipes 16 respectively start at an exhaust-gas outlet 34 of a working cylinder 32 and merge into a second exhaust-gas flow configuration or exhaust-gas flow channel 18. The first exhaust-gas flow configuration 14 includes a first catalytic converter 20 and the second exhaust-gas flow configuration 18 includes a second catalytic converter 22. Lambda probes 24 are disposed respectively upstream and downstream of the catalytic converters 20, 22.

A secondary air pump 26 is provided for supplying secondary air to the exhaust-gas. This secondary air pump up 26 is connected to the first exhaust-gas pipes 12 of the first exhaust-gas flow configuration 14 via a secondary air valve 28, such that secondary air can be selectively supplied to the first exhaust-gas flow configuration 14 with the first catalytic converter 20. The second exhaust-gas pipes 16 and thus the second exhaust-gas flow configuration 18 is completely separated from the secondary air supply 26, 28. Thus, only a part of the exhaust-gas system or a part of the catalytic converters is supplied with secondary air.

Figure 2:
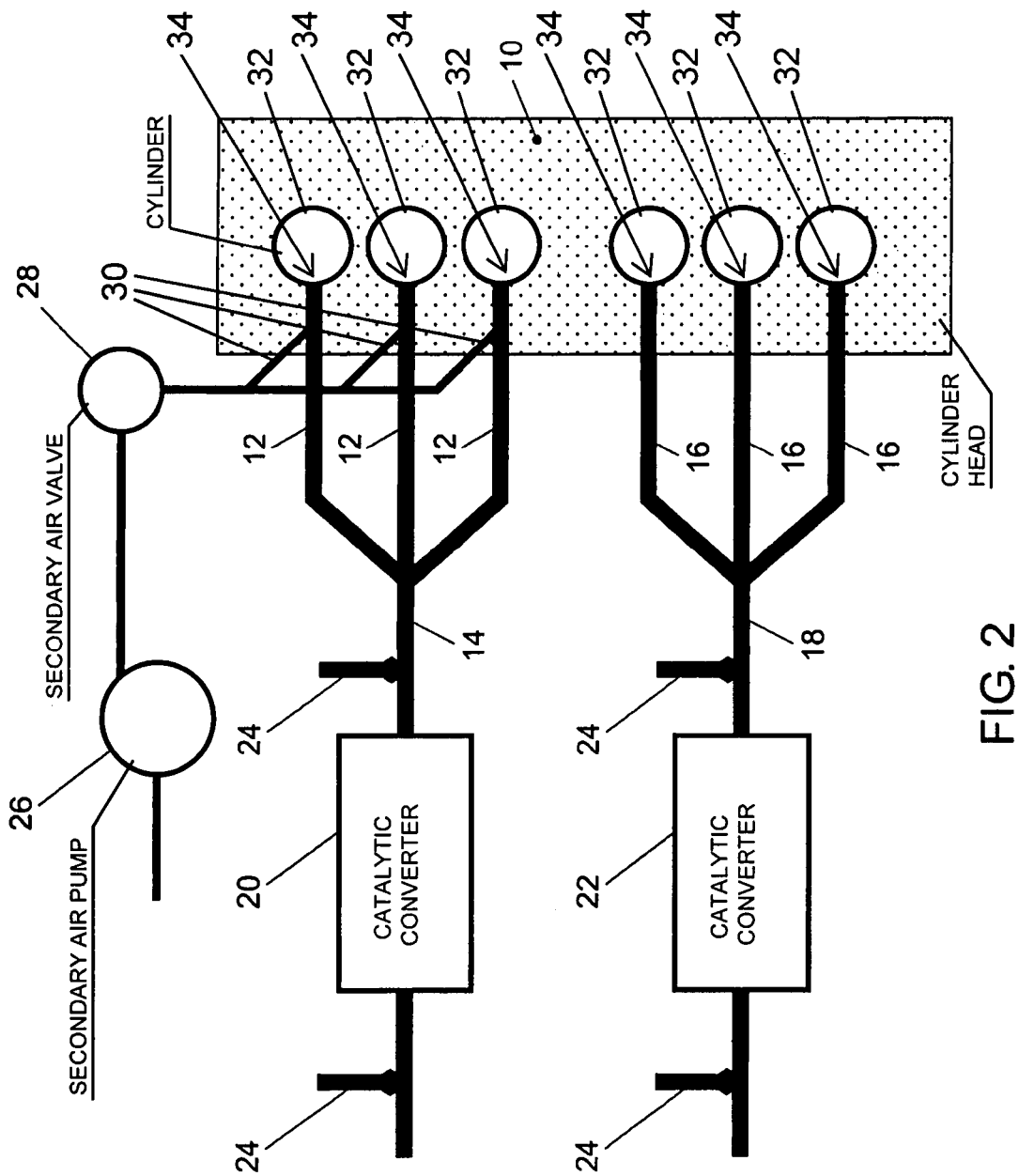
FIG. 2 is a schematic block diagram of a second preferred embodiment of an internal combustion engine in accordance with the invention.

Elements that have the same function are denoted with the same reference numerals in FIG. 2 and in FIG. 1 such that reference to the above description of FIG. 1 is made for the explanation of these elements in FIG. 2. In contrast to the first embodiment which is shown in FIG. 1, the second embodiment in accordance with FIG. 2 has six working cylinders 32 and respective three working cylinders 32 are brought together on the exhaust-gas side via three first exhaust-gas pipes 12 in the first exhaust-gas flow configuration 14 and three other ones of the working cylinders 32 are brought together via three second exhaust-gas pipes 16 in a second exhaust-gas flow configuration 18. The secondary air system 26, 28 is again only connected to the first exhaust-gas flow configuration 14, whereas the second exhaust-gas flow configuration 18 is completely separated from the secondary air system 26, 28 and at no point in time of the operation of the internal combustion engine is it supplied with secondary air.

In both of the above described embodiments, the secondary air pump 26 is connected, via several secondary air pipes 30, with each individual first exhaust-gas pipe 12, wherein in principle the secondary air pump 26 is connected, via at least one secondary air pipe 30, with the first exhaust-gas pipe 12.

What is claimed is:

1. An internal combustion engine, comprising:
    an exhaust-gas system including n>1 exhaust-gas flow configurations, n being an integer, said exhaust-gas flow configurations each including at least one catalytic converter;
    a secondary air supply system including at least one secondary air pump and at least one secondary air valve;
    said at least one secondary air pump being configured to be fluidly connected, via said at least one secondary air valve, to at most n−1 of said exhaust-gas flow configurations upstream of said at least one catalytic converter of said at most n−1 of said exhaust-gas flow configurations, and remaining ones of said exhaust-gas flow configurations being permanently separated from said secondary air supply system such that no fluid connection can be established between said at least one secondary air pump and said remaining ones of said exhaust-gas flow configurations;
    said remaining ones of said exhaust-gas flow configurations being configured to never be supplied with secondary air during operation of the internal combustion engine; and
    said exhaust-gas flow configurations being at least partly separated from one another such that no exhaust-gas is conveyed from a downstream end of said at least one catalytic converter of said remaining ones of said exhaust-gas flow configurations to an upstream end of said at least one catalytic converter of said at most n−1 of said exhaust-gas flow configurations.

2. The internal combustion engine according to claim 1, including:
    working cylinders having respective outlets;
    each of said exhaust-gas flow configurations including m≧1 exhaust-gas pipes, m being an integer;
    said exhaust-gas pipes of said exhaust-gas flow configurations being connected to respective ones of said outlets of said working cylinders;
    said exhaust-gas pipes of each respective one of said exhaust-gas flow configurations merging with one another upstream of said at least one catalytic converter of each respective one of said exhaust-gas flow configurations and forming a respective single exhaust-gas pipe; and
    each of said at most n−1 of said exhaust-gas flow configurations connected to said at least one secondary air pump being connected, with at least one of said m≧1 exhaust-gas pipes, to said at least one secondary air pump.

3. The internal combustion engine according to claim 2, wherein each of said at most n−1 of said exhaust-gas flow configurations connected to said at least one secondary air pump is connected, with all of said m≧1 exhaust-gas pipes, to said at least one secondary air pump.

* * * * *